United States Patent [19]

Ko

[11] Patent Number: 5,684,825
[45] Date of Patent: Nov. 4, 1997

[54] INDEPENDENTLY SWITCHED VOICE AND DATA CALLS USING A SIMULTANEOUS VOICE AND DATA MODEM

[75] Inventor: Kenneth David Ko, Clearwater, Fla.

[73] Assignee: Paradyne Corporation, Largo, Fla.

[21] Appl. No.: 216,373

[22] Filed: Mar. 23, 1994

[51] Int. Cl.⁶ .................................................. H04B 1/38
[52] U.S. Cl. ...................... 375/222; 375/220; 370/493; 379/100
[58] Field of Search ........................ 375/216, 220, 375/222, 377, 219, 221; 370/125, 62, 493, 494, 495; 379/100, 268, 273, 271, 272; H04B 1/38

[56] References Cited

U.S. PATENT DOCUMENTS

| | | | |
|---|---|---|---|
| 4,589,107 | 5/1986 | Middleton et al. | 370/62 |
| 4,593,389 | 6/1986 | Wurzburg et al. | 370/110.1 |
| 4,644,527 | 2/1987 | Anderson et al. | 370/58 |
| 4,689,788 | 8/1987 | Wurzburg et al. | 370/110.1 |
| 4,782,482 | 11/1988 | Kiatipov et al. | 370/86 |
| 4,849,811 | 7/1989 | Kleinerman | 358/133 |
| 5,036,513 | 7/1991 | Greenblatt | 370/125 |
| 5,166,924 | 11/1992 | Moose | 370/32.1 |
| 5,214,650 | 5/1993 | Renner et al. | 370/110.1 |
| 5,428,608 | 6/1995 | Freeman et al. | 370/60.1 |
| 5,537,436 | 7/1996 | Bottoms et al. | 375/222 |

OTHER PUBLICATIONS

U.S. application No. 08/176,002, Feiertag et al., filed Dec. 30, 1993.

Primary Examiner—Edward L. Coles, Sr.
Assistant Examiner—Madeleine Au Nguyen
Attorney, Agent, or Firm—Thomas, Kayden, Horstemeyer & Risley

[57] ABSTRACT

A central office of a public switched telephone network has a modem pool that includes both simultaneous voice and data (SVD) capable modems and standard, e.g., CCITT V.32 compatible, modems. A user with an SVD modem, i.e., an SVD user, establishes an SVD link with the SVD modem of the central office. These SVD modems exchange SVD signals that include voice and data. The SVD modem of the central office separates the voice and data portions of the SVD signal for separate transmission to different parties. The voice portion of the SVD signal receives standard voice-call handling from the central office for transmission to the party that is a part of the voice call. The data portion of the SVD signal is routed through the standard modem of the central office for transmission to the party that is a part of the data call. As a result, neither of these remote parties is required to have an SVD capable modem—yet the SVD user has both a voice connection and a data connection over a single "tip/ring" type telephone line.

2 Claims, 4 Drawing Sheets

CALLING SIGNAL

| SIGNAL NAME | TONE 1 | TONE 2 | SYMBOL RATE INDICATED |
|---|---|---|---|
| SVD CNG-a | 1550 Hz @ -3 dB | 825 Hz @ -3 dB | 3000 s/s |
| SVD CNG-b | 1550 Hz @ -3 dB | 875 Hz @ -3 dB | 2800 s/s |

ANSWER IDENTIFICATION SIGNAL*

| SIGNAL NAME | TONE 1 | TONE 2 | SYMBOL RATE INDICATED |
|---|---|---|---|
| SVD AID-a | 1000 Hz @ -3 dB | 801 Hz @ -3 dB | 3000 s/s |
| SVD AID-b | 1000 Hz @ -3 dB | 850 Hz @ -3 dB | 2800 s/s |

*FOLLOWED BY STANDARD 2100Hz ANSWER TONE

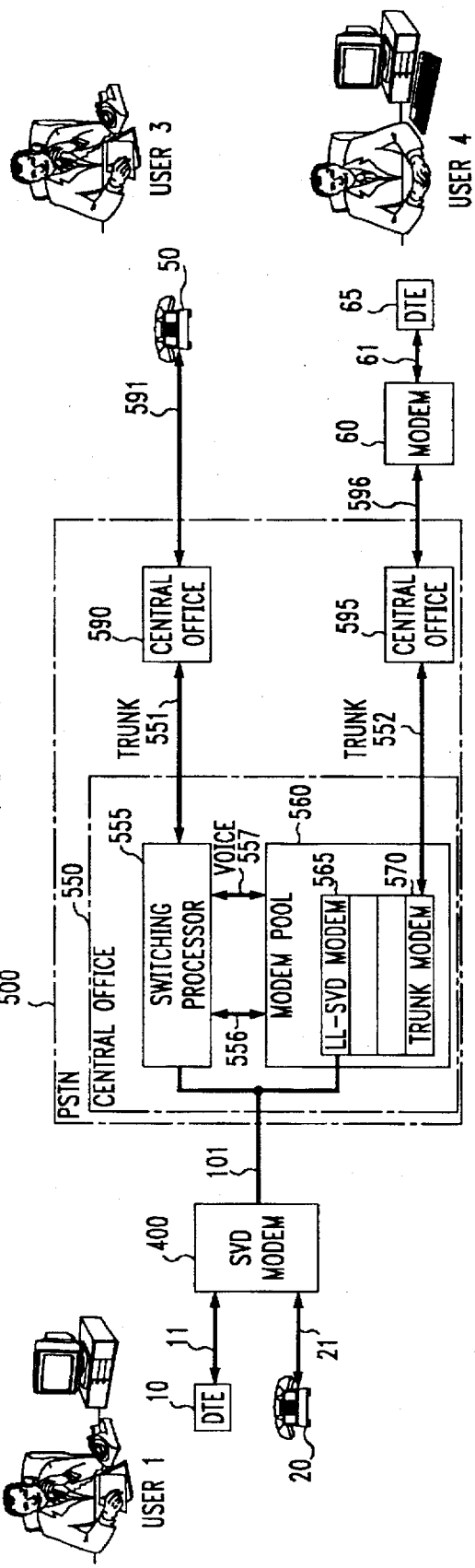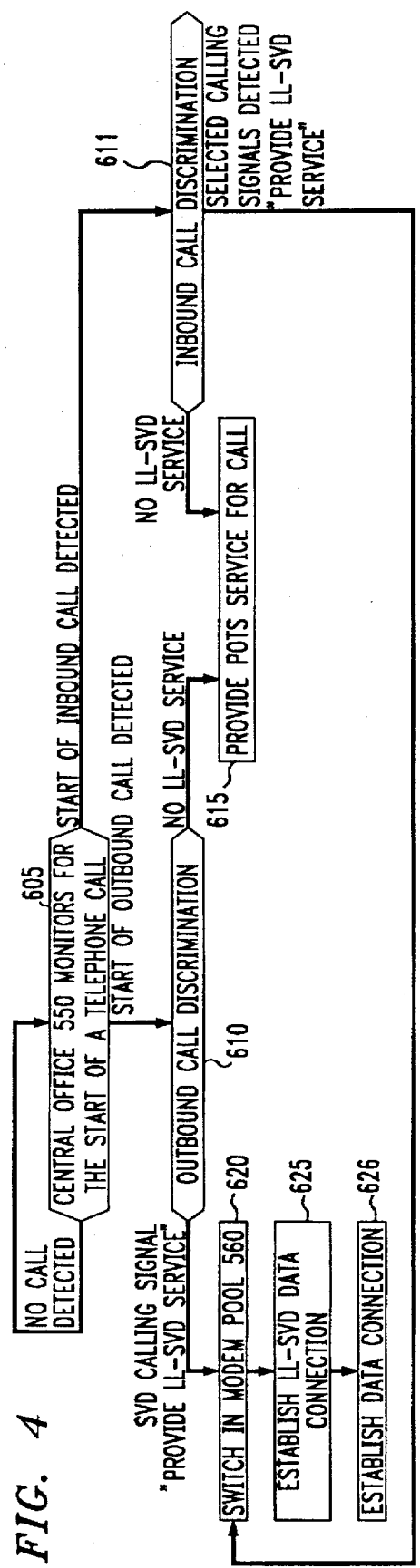

INDEPENDENTLY SWITCHED VOICE AND DATA CALLS USING A SIMULTANEOUS VOICE AND DATA MODEM

BACKGROUND OF THE INVENTION

The present invention relates to data communications equipment and, more particularly, to the simultaneous transmission of voice and data over a local loop using a simultaneous voice and data modem.

The co-pending, commonly assigned, U.S. patent application of Gordon Bremer and Kenneth D. Ko entitled "Simultaneous Analog and Digital Communication," U.S. Pat. No. 5,448,555 issued on Sep. 5, 1995, the contents of which are incorporated herein by reference describes a simultaneous voice and data communications system in which a voice signal is added to a data signal for transmission over a communications channel to a receiving modem.

In this simultaneous analog and digital communication system, the data signal to be transmitted is represented by a sequence of data symbols, where each data symbol is associated with a particular N-dimensional signal point value taken from a signal space. Similarly, the analog signal, which is represented by a voice signal, is processed so that it is mapped into the N-dimensional signal space to provide a voice signal point. This voice signal point defines the magnitude and angle of a voice signal vector about the origin of the signal space. The data symbol and the voice signal vector are then added together to select a resultant N-dimensional signal point, which is then transmitted to a far-end modem.

Upon reception of the transmitted N-dimensional signal point, the receiver of the far-end modem detects the embedded data symbol and subtracts the data symbol from the received N-dimensional signal point to yield the voice signal vector. This voice signal vector is then used to recreate the voice signal.

As a result, this technique advantageously provides a voice-band signal that has both an audio portion and a data portion. This allows two users with simultaneous voice and data capable modems to communicate data between them and talk at the same time—yet only requires one "tip/ring" type telephone line at each user's location.

SUMMARY OF THE INVENTION

The above-described technique for simultaneously transmitting both voice and data requires each user, or endpoint, to have a simultaneous voice and data (SVD) capable modem. However, I have realized that there are situations when an SVD user desires to have a voice conversation and a data connection at the same time—but with different parties. Therefore, I have discovered a method and apparatus that allows a central office of a public switched telephone network to provide a "local loop (LL)-SVD" service in which voice and data calls with a user co-exist over a voice-band "tip/ring" type telephone line, and the voice and data portions of these calls are muted to separate parties. This allows the user to establish a voice conversation with one party and a data connection with a different party over the user's same "tip/ring" type telephone line.

In one embodiment of the invention, a central office includes a modem pool that includes both SVD-capable modems and standard, e.g., CCITT (Consultative Committee International Telephone and Telegraph) V.32 compatible, modems. A user with an SVD modem, i.e., an SVD user, establishes an SVD link with the SVD modem of the central office. This SVD modem of the central office then separates the voice and data portions of the voice-band signal received from the local loop for separate transmission by the central office to different parties. The voice portion of the SVD signal receives standard voice-call handling from the central office for transmission to the party that is a part of the voice call. The data portion of the SVD signal is routed through the standard modem of the central office for transmission to the party that is a part of the data call. As a result, neither party is required to have an SVD-capable modem—yet the SVD user has both a voice connection and a data connection over a single "tip/ring" type telephone line.

Since the central office associated with the SVD user includes an SVD-capable modem, the SVD connection over the local loop is always terminated between two modems. In addition, this local loop connection between the SVD user and the central office does not change, i.e., it is always the same pair of wires. Therefore, the amount of time to perform a "train" in setting up a data or SVD connection can be significantly reduced by performing a "fast train" during the establishment of any data or SVD connection. This "fast train" is performed by storing and re-using the coefficients for equalization and echo canceling in each modem instead of adaptively regenerating them anew every time a data or SVD connection is established. Ideally, the coefficients for equalization and echo canceling do not have to be recalculated because the data connection over the local loop always uses the same physical pair of wires. Consequently, there is only the need to perform timing synchronization which reduces the training time to the order of milli-seconds (msec.) as compared to seconds for a standard modem training process.

BRIEF DESCRIPTION OF THE DRAWINGS

FIG. 3 shows a block diagram of a communications system embodying the principles of the invention;

FIG. 4 is an illustrative flow diagram embodying the principles of the invention;

DETAILED DESCRIPTION

Figures 1, 2:
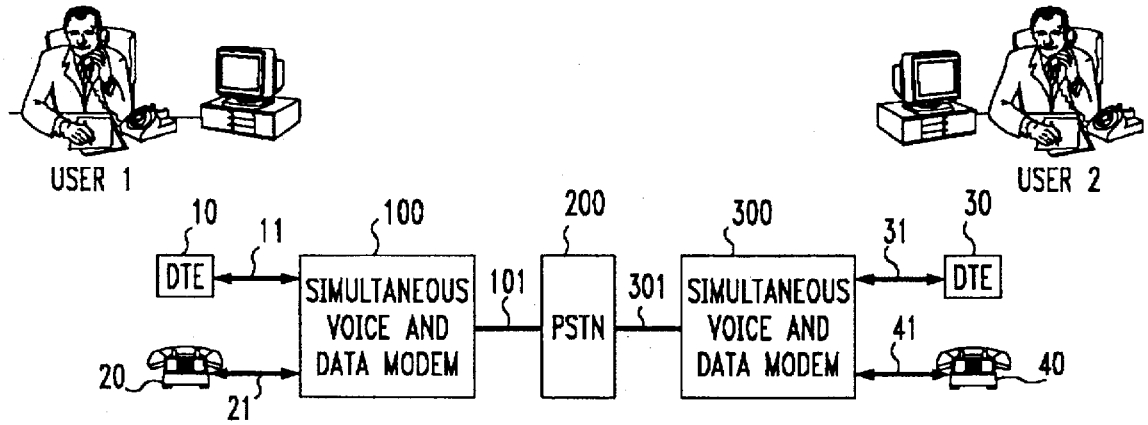
FIG. 1 shows a block diagram of an end-to-end simultaneous voice and data communications system between simultaneous voice and data user endpoints.
FIG. 2 is a table showing illustrative SVD identification signal assignments.

A block diagram of a simultaneous voice and data communications system between simultaneous voice and data user endpoints is shown in FIG. 1. This block diagram represents what is referred to herein as an "end-to-end" SVD link because voice and data calls are between the same calling and called parties through their respective SVD modems. In the description that follows, it is assumed that a communications path has already been established between user 1 and user 2 of FIG. 1. The communications equipment of user 1 includes data terminal equipment (DTE) 10, telephone 20, which represents voice terminal equipment, and SVD modem 100. The latter receives two types of signals for transmission to SVD modem 300—a data signal from DTE 10 and a voice signal from telephone 20. SVD modem 100 encodes both the data signal and the voice signal to provide a combined voice and data signal for transmission, via local loop 101, public switched telephone network (PSTN) 200, and local loop 301, to SVD modem 300. The basic operation of an SVD modem, other than the inventive concept, is described in the above-mentioned Bremer at. patent application entitled "Simultaneous Analog and Digital Communication," U.S. Pat. No. 5,448,555 issued on Sep. 5, 1995, SVD modem 300 receives the combined voice and data signal transmitted by SVD modem 100 and provides the data signal to DTE 30, and the voice signal to telephone 40. Transmission of data and voice signals in the opposite direction, i.e., from SVD modem 300 to SVD modem 100, occurs in a like fashion.

In the above description, it was assumed that an SVD connection already existed between the endpoints represented by SVD modem 100 and SVD modem 300. However, during the establishment of this SVD connection it is advantageous for the calling SVD modem to initially signal the far-end, or called, SVD modem, that the calling modem is also an SVD modem. This initial signaling is accomplished by the use of an SVD identification signal that is transmitted by the calling SVD modem after dialing the telephone number of the called SVD modem. This type of notification allows the answering SVD modem to immediately switch to an SVD mode as opposed to initially defaulting to a standard data modulation like CCITT V.32 and then switching to an SVD mode. An illustrative set of distinctive identification signals for use by an SVD modem is shown in FIG. 2. These hand-shaking signals include a calling signal, SVD CNG, which include calling tones "a" and "b," and an answer identification signal, SVD AID, which includes answering tones "a" and "b." The called SVD modem provides the answer identification signal as an acknowledgment to the calling SVD modem that the call has been answered by an SVD compatible modem.

As described above, an SVD signal provides a voice-band signal that allows two SVD users to communicate data between them and talk at the same time —yet only requires one "tip/ring" type telephone line, e.g., lines 101 and 301 of FIG. 1, at each user's location. However, this results in the voice call and the data call being "linked" together whenever a user with an SVD-capable modem desires to establish a simultaneous voice and data connection. In other words, the voice call can only be made between the terminal endpoints of an existing data connection, or the data call can only be made between the terminal endpoints of the existing voice connection. Yet, there are situations when an SVD user desires to have a voice conversation and a data connection at the same time—but with different parties. Therefore, I have discovered a method and apparatus that allows a central office of a public switched telephone network to receive a voice-band signal that includes an audio portion and a data portion, and to separately transmit the voice portion and the data portion to different parties. As a result, an SVD user can establish a voice conversation with one party and a data connection with a different party—over the same "tip/ring" type telephone line.

A block diagram of a communications system embodying the principles of this invention is shown in FIG. 3. The communications equipment of user 1 includes data terminal equipment (DTE) 10, telephone 20, which represents voice terminal equipment, and SVD modem 400. The latter receives two types of signals for transmission to PSTN 500-a data signal from DTE 10 and a voice signal from telephone 20. SVD modem 400 encodes both the data signal and the voice signal to provide a combined voice and data signal—an SVD signal—for transmission, via local loop 101, to PSTN 500. Local loop 101 is a typical "tip/ring" facility, i.e., a wire-pair, upon which a voice-band signal is transmitted between the terminal equipment of user 1, i.e., SVD modem 400, and PSTN 500. The latter is represented for simplicity by three central offices (COs): CO 550, CO 590, and CO 595. It should be understood that PSTN 500 can include less, or more, central office-type switching equipment depending on the actual geographical locations of the calling and called parties. Except for the inventive concept described below, PSTN 500 functions as in the prior art in the routing and establishment of voice or data telephone calls.

In accordance with the inventive concept, CO 550 provides a "local loop (LL)-SVD" service in which concurrent voice and data calls are established over voice-band local loop 101 to user 1, and the voice and data portions of these concurrent calls are routed to separate telephone numbers, e.g., different parties as represented by users 3 and 4. CO 550 includes switching processor 555 and modem pool 560. Switching processor 555 not only provides well-known call handling functions as in the prior art but also, in accordance with the inventive concept, controls modem pool 560 via line 556, which represents a control path, e.g., a control bus, for signaling and controlling modem pool 560. Modem pool 560 is, in essence, multiple pairs of back-to-back modems located at CO 550, which provides telephone service to user 1. Any modem-pair of modem pool 560 is dynamically allocated to a particular local loop when required. One modem-pair of modem pool 560 is represented by local loop (LL)-SVD modem 565 and trunk modem 570. LL-SVD modem 565 is similar to SVD modem 400 of user 1 and provides simultaneous voice and data functionality. Trunk modem 570 conforms to any one of the standard modulation techniques like CCITT V.32. Modems 565 and 570 can be implemented as two discrete devices, one device with multiple ports (since the back-to-back modem pair is never separated), or as software in a central switch with digital signal processing (DSP) capabilities. For example, while the modem interface to the local loop can be through a codec, the interface to the CO trunk could be implemented without D/A or A/D conversions.

For the purposes of the following discussion, user 1 of FIG. 3 desires to establish a voice connection with user 3 and a separate, and independent, data connection with user 4. Consequently, user 1 subscribes to the "LL-SVD" service of the local exchange carder that owns CO 550. It should be noted that if user 1 should, instead, desire an "end-to-end" SVD connection, or link, like that shown in FIG. 1, it is assumed the "LL-SVD" service, like other central office services such as "call waiting," can be temporarily disabled by user 1 through special signaling, e.g., the entry of a unique touch-tone code by user 1 from telephone 20. When "LL-SVD" service is disabled, CO 550 disables modem pool 560 and simply provides "plain old telephone service" (POTS) to user 1 for inbound or outbound calls and ignores any SVD control signaling on local loop 101. The "LL-SVD" service can also be selectively disabled for the duration of a single call in other ways. For instance, during an outbound call the "LL-SVD" service can be disabled when CO 500 detects a standard data modem or fax training sequence from SVD modem 400 of user 1. These signals indicate that user 1 has configured SVD modem 400 in a mode other than SVD mode, e.g., a standard data mode (described below).

SVD modem 400 of user 1 operates in either a voice-only mode, a data-only mode, facsimile (fax) mode, or an SVD mode. The voice-only mode prohibits the establishment of a data call over local loop 101. Similarly, the data-only mode prohibits the establishment of a voice call over local loop 101. The fax mode allows SVD modem 400 to pass a fax transmission between user 1 and another party. The fax mode is described in the co-pending, commonly assigned, U.S. patent application of Bremer entitled "Conversion of a Fax Modulation to a Data Modulation," U.S. Pat. No. 5,513,212 issued on Apr. 30, 1996, the contents of which are incorporated herein by reference. Finally, SVD mode allows SVD modem 400 to establish voice, data, fax, or voice and data calls over local loop 101.

It is assumed that user 1 has configured SVD modem 400, e.g., through a "command-mode" interface via DTE 10, to operate in the SVD mode. Once enabled in SVD mode, SVD modem 400 provides different signals to CO 550 depending on the status of local loop 101. For example, if there are no prior active telephone calls on local loop 101, then upon detecting the "off-hook" signal from telephone 20, SVD modem 400 provides typical voice call signaling to CO 550 over local loop 101 by either directly passing through the "off-hook" signal to CO 550, or by simply regenerating another "off-hook" signal to CO 550. In other words if just a voice call is being set up, SVD modem 400 effectively transparently passes any telephone signaling, like the "off-hook" signal, subsequently dialed digits, and the subsequent voice signal, to CO 550, via local loop 101. In the reverse direction, SVD modem 400 similarly passes any signal on line 101 to telephone 20.

In order for the voice and data signal paths to be independently switched at different times, signaling and call handling processes must be established. The following conditions can be in effect on local loop 101 when user 1 is either the calling party or the called party of a call attempt (either data or voice):

1) local loop 101 is not use;
2) local loop 101 is in use with an existing data call via "LL-SVD" service;
3) local loop 101 is in use with an existing voice call, via POTS service; and
4) local loop 101 is in use with both data and voice in an SVD call via "LL-SVD" service.

FIG. 4 shows an illustrative flow diagram embodying the principles of this invention. In this example, it is assumed that local loop 101 is not in use, i.e., the status of local loop 101 is the above-mentioned condition 1. In step 605, switching processor 555 of CO 550 monitors for the start of a telephone call either from local loop 101, hereafter referred to as an "outbound call," or via signaling from trunks 551 and 552, hereafter referred to as an "inbound call," and collects call information from the calling parties, e.g., the called party telephone number.

If the start of a call is detected from local loop 101, e.g., via the detection of an "off-hook" signal, switching processor 555 then performs "outbound call discrimination" in step 610. In this step, switching processor 555 monitors local loop 101 for an SVD calling signal. If no signal of any kind (data, fax, or SVD) is detected, switching processor 555 goes to a 'voice-only' mode in step 615, i.e., the above-mentioned condition 3, and provides POTS service to user 1 to complete the telephone call. If a standard modem or fax calling signal is detected from SVD modem 400, then switching processor 555 suspends "LL-SVD" service and operates in POTS mode for the duration of the data call until an absence of energy (such as that required to re-enable the PSTN network echo cancelers) indicates the end of the data connection.

However, if switching processor 555 detects an SVD calling signal in step 610, then switching processor 555 provides "LL-SVD" service in steps 620 through 626. In step 620, switching processor 555 switches in the modem pair comprising LL-SVD modem 565 and trunk modem 570 from modem pool 560 via line 556. In other words, modem pool 560 effectively "breaks into" any attempted data connection. In the context of FIG. 3, the desired data connection is between user 1 and user 4, either of which can be the originating parties. In "breaking in" to the data connection, the modem pair, which comprises LL-SVD modem 565 and trunk modem 570, terminates both ends of the data connection so that trunk modem 570 emulates the local endpoint modem to the far end, i.e., modem 60 of user 4, and LL-SVD modem 565 initiates an LL-SVD session with local SVD modem 400 of user 1. In step 625, the data link between LL-SVD modem 565 and SVD modem 400 is established as a simultaneous voice and data signal with a data channel and a voice channel, which is currently idle, i.e., condition 2, described above; while in step 626, the data link between trunk modem 570 and modem 60 is established in accordance with a standard, e.g., V.32, modulation technique. For an outbound data call, step 626 includes trunk modem 570 dialing the called party telephone number provided by switching processor 555 via line 556.

When switching processor 555 detects the start of an inbound call, switching processor 555 performs "inbound call discrimination" in step 611. In the latter step, switching processor 555 monitors inbound calls to discriminate between voice, data, SVD, and fax calls. Since not all non-SVD capable data modems provide data calling tones, there is no universal, clear cut, call discrimination algorithm. As such, step 611 is just one illustrative representation of an inbound call discrimination algorithm that selectively treats any inbound call as a function of the calling tone, if any. In this embodiment, it is assumed user 1 does not expect inbound data calls but does expect to receive facsimile transmission, i.e., fax calls. Therefore, in step 611 switching processor 555 provides "LL-SVD" service, via steps 620, 625, and 626, whenever a fax calling tone is detected. However, if no such signal is detected, switching processor 555 provides POTS service to the inbound call, whether voice or data, in step 615. It should be noted that in this embodiment, if switching processor 555 detects an inbound SVD calling tone in step 611, switching processor suspends "LL-SVD" service and operates in POTS mode for the duration of the SVD session, until an absence of energy (such as that required to reenable the PSTN echo cancelers) indicates the end of the SVD connection. As a result, this allows user 3 to establish an end-to-end SVD connection. This case is analogous to that in which user 1 manually disables the "LL-SVD" service in order to establish, via an outbound call, an end-to-end SVD connection.

In regards to any inbound call discrimination function performed by switching processor 555, it should be noted that the "LL-SVD" service can allow user 1 to configure the inbound call discrimination to meet the particular needs of the user, e.g., similar to the way the user might configure their local modem to perform call discrimination if there was no "LL-SVD" service. For instance, user 1 may only select a non-SVD data calling signal as triggering the creation of an LL-SVD connection in steps 620 through 626. Consequently, any inbound fax call would receive POTS service.

In regards to SVD modem 400, for an outbound call voice call, SVD modem 400 functions as described above, i.e., SVD modem 400 effectively transparently passes through any voice call signaling from telephone 20 to CO 550. With respect to an inbound voice call, SVD modem 400 performs a similar call discrimination step to that performed by CO 550. After detecting a ringing signal, which is a pans of the POTS service provided by CO 550, SVD modem 400 defaults to passing through any voice call signaling after failing to detect any modem type signal on local loop 101.

For an outbound data call, SVD modem 400 goes "off-hook," provides the called party number, and then provides the above-mentioned SVD calling signal to switching processor 555, which as can be seen in FIG. 3, is coupled to local loop 101. As already described, switching processor 555 uses the SVD calling signal to perform the above-mentioned call discrimination of step 610. Similarly, for an inbound data call enabled to received "LL-SVD" service, LL-SVD modem 565 goes "off-hook" and provides the SVD calling signal to local loop 101 for transmission to SVD modem 400, which upon detection of this SVD calling signal completes the LL-SVD link initialization, e.g., sends an SVD answer signal, standard answer tone, training, etc.

Once the status of local loop 101 changes from condition 1 to either condition 2 or condition 3, the first of two calls, either voice or data, has been established. The subsequent steps taken by CO 550 to establish the second of the two calls depends upon whether local loop 101 is in condition 2 or condition 3.

Figure 5:
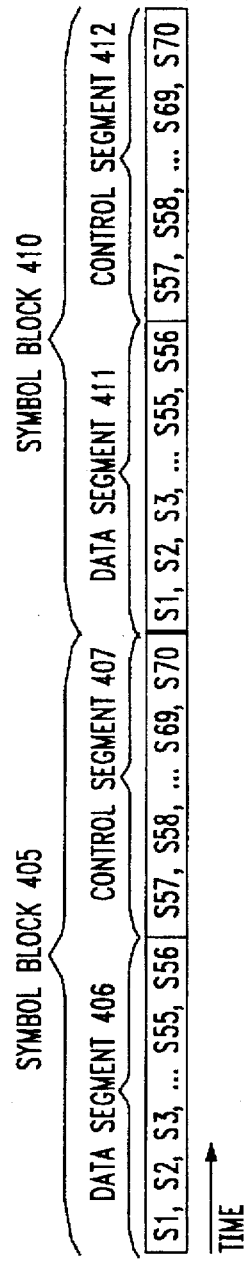
FIG. 5 is an illustrative SVD symbol block illustrating the use of a secondary channel.

When local loop 101 is in condition 2, the voice channel of the SVD signal transmitted over local loop 101 is not in use and all signaling and control for this voice channel is transmitted over an SVD secondary channel between SVD modem 400 and LL-SVD modem 565. An SVD secondary channel can be implemented in any number of ways. For example, as is known in the art, a secondary channel can be provided by multiplexing the data modulated signal (here the SVD signal) with another control signal; or a secondary channel can be provided as described in the co-pending, commonly assigned, U.S. patent application of Bremer et al. entitled "Side-Channel Communications in Simultaneous Voice and Data Transmission," U.S. Pat. No. 5,513,212 issued on Apr. 30, 1996. FIG. 5 shows a diagram of a transmission scheme that includes a side-channel within an SVD signal. This SVD side-channel not only provides for the transport of additional information between any SVD endpoints—but also allows the voice signal to be transmitted across the full bandwidth of the SVD data connection. As can be observed from FIG. 5, information from an SVD modem is provided in a frame, or "symbol block," e.g., symbol block 405. For the purposes of this example, a symbol block comprises 70 symbols. Consecutive symbols within each symbol block are identified as S1, S2, S3, . . . , S70. Each symbol block is further divided into a data segment, e.g., data segment 406; and a control segment, e.g., control segment 407. Let the group of symbols in the data segment be S1 to S56. These are the "data symbols" and always convey DTE data. For the purposes of the following discussion the symbol rate is illustratively 3000 symbols/ second (s/sec.), although other symbol rates may be used, e.g., 2800 s/sec. At a symbol rate of 3000 s/see., the average data symbol rate of a symbol block is equal to (56/0)×3000) =2400 s/sec. Consequently, if there are 6 bits of data per data symbol, the resultant data rate is 14400 bits/see (bps). It is assumed that this data rate is high enough to meet a user's needs so that the remaining bandwidth of the SVD data connection can be allocated to the control segment, which provides the side-channel.

The remaining symbols of the control segment, i.e., S57 to S70, are the "control symbols." Usually, the latter never convey DTE data, but convey control information. Each control symbol represents a number of "control bits." The control symbols are encoded and scrambled the same as the DTE data symbols, e.g., they use the same signal space. The control symbols provide the side-channel for conveying additional signaling information between SVD modem 400 and CO 550. Although the data symbols represent user data and the control symbols represent control information, both the data and control symbols may also convey analog data, which in this example is any voice signal that is provided to SVD modem 400 by telephone 20. As a result, the side-channel is a part of the simultaneous voice and data transmission.

Figure 6:
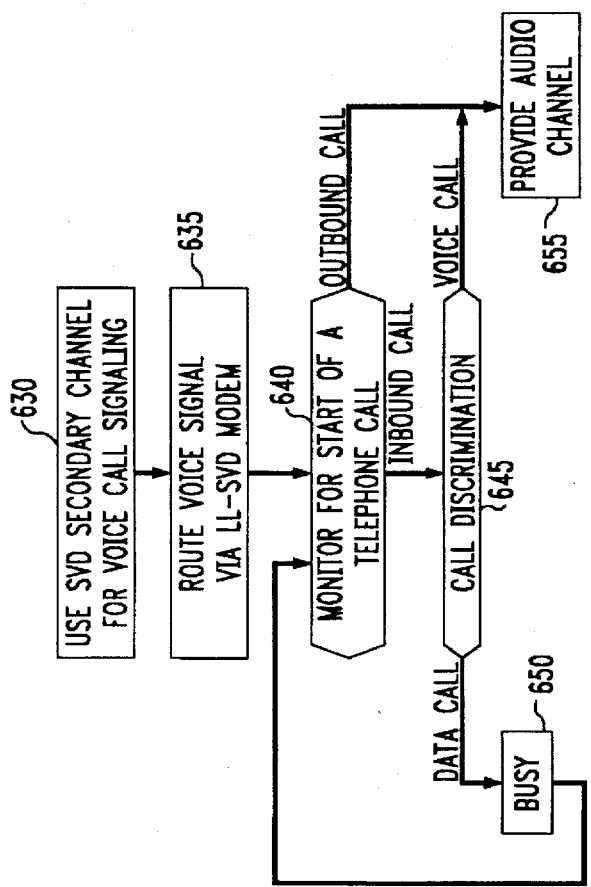
FIG. 6 is an illustrative flow diagram embodying the principles of the invention for adding a voice call to an existing data call.

At this point, it is assumed that local loop 101 is in condition 2. Turning now to FIG. 6, an illustrative flow diagram is shown for adding an additional, and independent, voice call to the pre-existing data call on local loop 101. In step 630 of FIG. 6, switching processor 555 uses the SVD secondary channel for voice-call signaling, via line 556 and LL-SVD modem 565. This SVD secondary channel allows switching processor 555 of CO 550 to both monitor local loop 101 and transmit voice call signaling to telephone 20. Consequently, SVD modem 400 transmits on/off hook signaling and dialing to the CO by means of this SVD secondary channel via LL-SVD modem 565, and CO 550 transmits dial tone to telephone 20. In this manner an outbound voice call from user 1 is originated to an independent remote location in the middle of an existing data session. Similarly, for an inbound voice call to user 1, CO 550 uses the SVD secondary channel to transmit signaling, like ringing, from CO 550 to SVD modem 400, which then alerts user 1 by either ringing the telephone or providing an equivalent alerting mechanism, e.g., putting a tone on a modem speaker of SVD modem 400. (As known in the art, most modems have an internal speaker). The information from the SVD side channel is transmitted between switching processor 555 and LL-SVD modem 565 via control line 556. Similarly, switching processor 555 now routes any subsequent voice signal via LL-SVD modem 565, via line 557, in step 635.

After switching to using the SVD secondary channel for voice call signaling over local loop 101, switching processor 555 monitors for the start of a telephone call in step 640. For instance, if the start of an outbound voice call is detected from local loop 101, e.g., via the detection of an "off-hook" signal via the SVD secondary channel, switching processor 555 then goes to step 655 to provide an audio channel for the subsequent voice call via line 557. Since switching processor 555 already knows there is a data call in progress between user 1 and user 4, there is no need for switching processor 555 to perform call discrimination on an outbound voice call. On the other hand, if switching processor 555 first receives an incoming call on trunk 551, switching processor 555 goes to step 645 and performs call discrimination as described above. Switching processor 555 treats the incoming call as a voice call upon falling to detect any modem type signal and provides an audio channel, via line 557, to complete the call in step 655. However, if a modem type signal is detected by switching processor 555, the latter provides a busy indication in step 650 back to that calling party because local loop 101 already has an established data connection with user 4.

Figure 7:
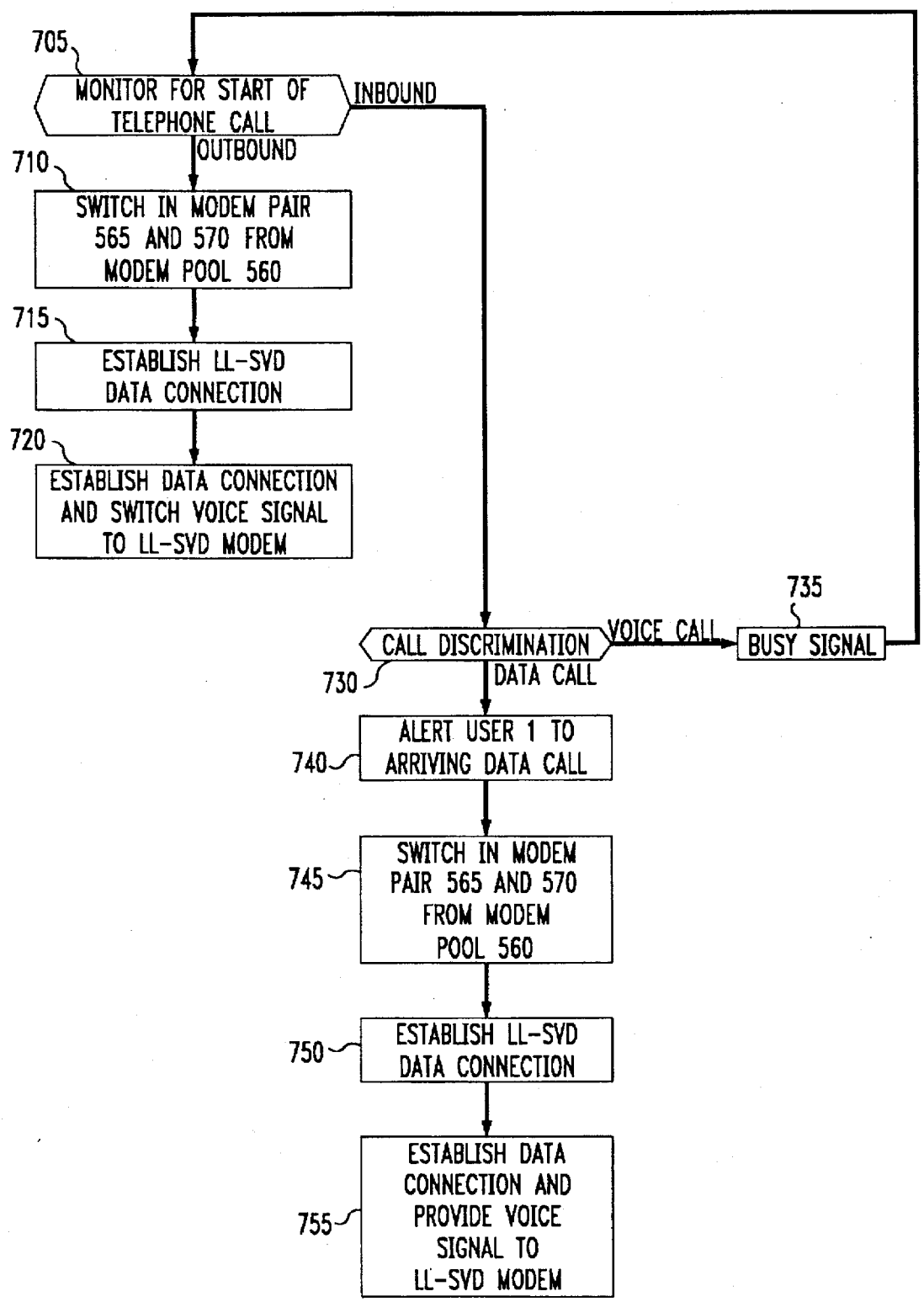
FIG. 7 is an illustrative flow diagram embodying the principles of the invention for adding a data call to an existing voice call.

When local loop 101 is in condition 3, an additional, and independent, data call is added to the pre-existing voice call on local loop 1 as shown in the illustrative flow diagram of FIG. 7. Similar to steps 605 and 630 described above, switching processor 555 monitors for the start of a data call in step 705 and performs a different sequence of steps depending on whether an outbound data call is detected or an inbound data call is detected in step 705.

To establish an outbound data call in the middle of a voice session, switching processor 555 monitors local loop 101 in step 705 for a request-for-training signal from SVD modem 400. The latter sends this predefined signal to CO 550 to initiate a data call, e.g., by sending the above-described SVD calling signal. Unfortunately, this request—for-training signal temporarily interrupts the voice conversation on local loop 101. However, since user 1 is initiating the data call, user 1 can simply ask the other party of the voice call, here represented by user 3, to "hold-on" while a data call is established.

Switching processor 555 acknowledges the request for training to SVD modem 400 by switching in the modem pair comprising LL-SVD modem 565 and trunk modem 570, from modem pool 560, in step 710. At this point, switching processor 555 enables LL-SVD modem 565 via line 556. LL-SVD modem 565 detects the SVD calling tone and establishes an LL-SVD connection between SVD modem 400 and LL-SVD modem 565 in step 715. The length of interruption to the voice call is a function of the length of time to set up the data connection, i.e., how long it takes for SVD modem 400 and LL-SVD modem 565 to "train-up." For conventional end-to-end training this can be on the order of seconds. However, this time interval can be significantly Shorted to the milli-second range by the use of the "fast LL-SVD train" feature, described below.

After the training process, the voice conversation is switched over to the voice channel of the SVD link while trunk modem 570 dials remote data modem 60 to establish the data call in step 720. Data call specific information is transmitted via the SVD secondary channel to switching processor 555 which controls trunk modem 70. Once the voice conversation is provided over the SVD link, LL-SVD modem 565 provides the voice signal over line 557 to switching processor 555. Similarly, switching processor 555 provides the voice signal generated by user 3 over line 557 to LL-SVD modem 565 for transmission within the SVD signal to SVD modem 400, which provides the voice portion of the signal to telephone set 20. If the data call is not successfully established, switching processor 555 backs-out modem pool 560 and reverts back to condition 3.

For an inbound data call over trunk 552, switching processor 555 goes to step 730 to perform call discrimination. In this example, it is assumed that if switching processor 555 fails to detect a modem type signal, switching processor 555 presumes the inbound call is a voice call and provides a busy signal in step 735 to that caller since there is already a voice call on local loop 101. Alternatively, instead of providing a busy signal in step 735, CO 550 can route the incoming voice call to a voice mailbox or use call waiting. Switching processor 555 then returns to step 705 and waits for another call attempt.

However, if a modem type signal is detected by switching processor 555, the latter presumes it is a data call and performs step progress over local loop 101 by issuing an audible signal to alert user 1 of an impending interruption to set up a data call and initiate an LL-SVD session. Then switching processor 555 switches in the modem pair comprising LL-SVD modem 565 and trunk modem 570, from modem pool 560, in step 745. In step 750, the data link between LL-SVD modem 565 and SVD modem 400 is established as a simultaneous voice and data signal with a data channel and a voice channel; while in step 755 the data link between trunk modem 570 and modem 60 is established in accordance with a standard, e.g., V.32, modulation technique. Again, the training time over the LL-SVD link can be kept to a minimum by the use of an LL-SVD fast train, described below. Also, in step 755, switching processor 555 now routes any voice signal to and from user 1 through LL-SVD modem 565 so that the voice channel of the SVD signal now carries the pre-existing voice call.

As mentioned earlier, the "LL-SVD" service can be optioned to perform inbound call discrimination in a variety of different ways. For example, if reception of data calls is important to user 1, and no modem type signal is detected by switching processor 555 in step 730, then the "LL-SVD" service could be optioned to proceed with call handling on the assumption that any inbound call is a data call and perform steps 740 through 755. As a result, any incoming call first receives answertone from a trunk modem of modem pool 560. If training is initiated in response to the answertone, then CO 550 performs the appropriate data call processing, e.g., initiating an LL-SVD session, as described above. If no training is initiated, CO 550 presumes the incoming call is a voice call and, if there is a pre-existing voice call over local loop 101, either provides some type of call coverage or a busy signal; or, if there is no pre-existing voice call over local loop 101, CO 550 provides POTS service or an audio channel to the incoming call voice call.

Once a pair of calls share common local loop 101, condition 4 is reached and CO 550 responds to any additional incoming call attempts with a busy signal, or, alternatively, provides a call coverage service like voice mall, call waiting, etc. In condition 4, the signal paths for the established voice and data calls are as follows. The analog (voice) call is routed from telephone 20 to the voice port of SVD modem 400 via line 21. SVD modem 400 transmits the voice signal through local loop 101 as an SVD signal. At the local CO, i.e., CO 550, the voice signal is recovered by LL-SVD modem 565 and provided to switching processor 555, via line 557, for treatment as a normal POTS telephone call. As a result, the voice signal received on line 551 is transmitted over trunk 551 to telephone 50 of user 3 via CO 590. Transmission of a voice signal from user 3 to user 1 occurs through the identical path in the opposite direction.

With respect to the data call, any data signal provided by DTE 10 of user 1 is routed to the data port of SVD modem 400 via line 11. This data signal is transmitted through local loop 101 as an SVD signal. At CO 550, the data signal is recovered from the SVD signal by LL-SVD modem 565 and remodulated as a standard (V.32 or other standard modulation) modem signal by trunk modem 570. This signal is transmitted through trunk 552 to modem 60 of user 4, via CO 595. Modem 60 demodulates the standard modem signal and provides a received data signal to DTE 65. Transmission of a data signal from user 4 to user 1 occurs through the identical path in the opposite direction.

Existing CO services can coexist with the LL-SVD service over local loop 101, because the CO has a priori knowledge of whether the existing call is voice or data and can be optioned to only interrupt voice calls. Any required signaling can be transmitted via the SVD secondary channel, e.g., a switchhook flash to indicate call waiting.

Ending an LL-SVD session is handled simply by maintaining an LL-SVD session for as long as the data link is required. If the voice session is disconnected in the middle of a data session, the voice channel goes back to emulating an available voice loop, i.e., condition 2. If the data session is disconnected in the middle of an existing voice session, the local loop is switched back to POTS mode, i.e., condition 3, and the CO modems are returned to the shared resource pool.

Note that since the local loop can generally be considered to have unchanging characteristics, training for an LL-SVD session can be accomplished very quickly by making use of tap storage in modem pool 560 of CO 550, because the data connection over the local loop is always terminated between two modems, e.g., SVD modems 400 and 565. Since the local loop connection physically does not change between the SVD party and the central office, i.e., it is always the same pair of wires, both of these SVD modems can perform a "fast train" during the establishment of any SVD connection. This "fast train" is performed by storing and re-using the coefficients for equalization and echo canceling in each SVD modem instead of adaptively regenerating them anew every time an SVD connection is established. Consequently, there is only the need to perform timing synchronization which reduces the training time to the order of milli-seconds (msec.) as compared to seconds for a standard modem training process. Note that since a modem pool is really a shared resource, i.e., a particular LL-SVD modem of the modem pool will be assigned to different local loops for different users, switching processor 555 stores a set of coefficients for each LL-SVD service subscriber. When that subscriber initiates an LL-SVD connection, switching processor 555 recalls the respective stored coefficients from a non-volatile storage mechanism for use by the selected LL-SVD modem from the modem pool.

As described above, the inventive concept allows independently switched voice and data calls from a calling party to different, and independent, endpoints even though both the voice call and the data are over a common "tip/ring" type local loop between the SVD party and their central office or local exchange carrier. Neither of the other party's locations requires any special equipment, other than existing technology like CCITT V.32, or other standard, modem for the remote location using the data link. The data and voice calls do not have to be established at the same time, nor do they have to be disconnected at the same time. In effect, the current invention allows a single conventional 2-wire telephone connection to the home to serve at if it were two independent lines, one for data and the other for voice connections.

It should also be realized that although the embodiment described above illustrated two physically separate users, e.g., users 3 and 4, this invention also applies to a single user with two telephone lines, e.g., a data line and a voice line, each with a different telephone number.

The foregoing merely illustrates the principles of the invention, and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., a modem pool comprising an SVD modem and a standard-type modem, one or more of those building blocks can be carried out using one or more appropriate programmed processors, e.g., a digital signal processor. Also, although the central office modem functionality was illustrated as a shared resource, i.e., a modem pool, the modems instead could be dedicated to each SVD customer. Further, even though the data connection was illustrated in the context of CCITT V. 32 and SVD, the term data, as used herein, includes fax.

In addition, although an SVD secondary channel was used above to control the voice channel over an LL-SVD link, it should be realized that control and signaling information can alternatively be sent within the voice channel itself. For example, dial tone and dual tone multi-frequency (DTMF) signaling can be transmitted within the voice channel as opposed to being encoded within an SVD secondary channel.

Also, there are other methods for use by CO 560 in establishing additional data and voice calls. For instance, the user's SVD modem can always establish an LL-SVD link even though no data is being sent over the data portion of the SVD signal. This also eliminates the necessity to perform a training function with any subsequent data call between SVD modem 400 and LL-SVD modem 565. If there is an existing voice call, CO 560 can interrupt the voice call with a "call waiting" signal using the SVD secondary channel to transmit the switchhook signaling.

Finally, although the above-described technique illustratively used SVD technology to provide concurrent voice and data communications over a voice-band local loop, it should be realized that this approach also applies to other derivative voice-band modem technologies that provide concurrent voice and data call handling. For example, a voice-band modem modified to simply time division multiplex between a voice signal and a data signal could also be used to anchor each endpoint of a local loop, e.g., in place of SVD modem 400 of user 1 and LL-SVD modem 565 of CO 550. This would similarly allow switching processor 555 of CO 550 to separately switch the voice portion and the data portion of the multiplexed signal on local loop 101 to different parties.

I claim:

1. Switching apparatus coupled via a voice-band communications channel to communications equipment of a user, the apparatus comprising:

a modem pool; and processing equipment for detecting whether a telephone call over the voice-band communications channel is a voice-only, a data-only, or a voice and data call, such that a) in response to a voice-only call, the processing equipment establishes the telephone call over the voice-band communications channel without routing the voice-only telephone call through the modem pool, and b) in response to a data call or a voice and data call, the processing equipment dynamically switches the telephone call through the modem pool without dropping any previously active voice-only call over the voice-band communications channel.

2. The apparatus of claim 1 wherein the modem pool includes at least one simultaneous voice and data modem and at least one data-only modem, and wherein a data call portion of any telephone call is routed through the simultaneous voice and data modem and the data-only modem.

* * * * *

UNITED STATES PATENT AND TRADEMARK OFFICE
CERTIFICATE OF CORRECTION

PATENT NO. : 5,684,825
DATED : November 4, 1997
INVENTOR(S) : Ko

It is certified that error appears in the above-identified patent and that said Letters Patent is hereby corrected as shown below:

In column 3, line 9 delete "at." and replace with "et al.".

In column 4, line 49, delete "carder" and replace with "carrier".

In column 6, line 19, delete "I" and replace with "1".

In column 7, line 7, delete "pans" and replace with "part".

In column 7, line 61, delete "56/0" and replace with "56/70".

In column 7, line 63, delete "see" and replace with "sec".

In column 8, line 57, delete "falling" and replace with "failing".

In column 9, line 29, delete "Shorted" and replace with "shorted".

In column 10, line 30, delete "mall" and replace with "mail".

Signed and Sealed this

Seventeenth Day of February, 1998

Attest:

BRUCE LEHMAN

*Attesting Officer*   *Commissioner of Patents and Trademarks*